(12) United States Patent
Fan et al.

(10) Patent No.: US 11,748,295 B2
(45) Date of Patent: Sep. 5, 2023

(54) SCRAMBLE AND DESCRAMBLE HARDWARE IMPLEMENTATION METHOD BASED ON DATA BIT WIDTH EXPANSION

(71) Applicant: CORIGINE (SHANGHAI), INC., Shanghai (CN)

(72) Inventors: Kai Fan, Huzhou (CN); YirngAn Chen, Santa Clara, CA (US); Sheng Lu, Huzhou (CN)

(73) Assignee: CORIGINE (SHANGHAI), INC., Shanghai (CN)

( * ) Notice: Subject to any disclaimer, the term of this patent is extended or adjusted under 35 U.S.C. 154(b) by 18 days.

(21) Appl. No.: 17/916,667

(22) PCT Filed: Jan. 29, 2021

(86) PCT No.: PCT/CN2021/074376
§ 371 (c)(1),
(2) Date: Oct. 3, 2022

(87) PCT Pub. No.: WO2021/203808
PCT Pub. Date: Oct. 14, 2021

(65) Prior Publication Data
US 2023/0131594 A1    Apr. 27, 2023

(30) Foreign Application Priority Data
Apr. 10, 2020   (CN) .......................... 202010278422.0

(51) Int. Cl.
*G06F 13/42*    (2006.01)

(52) U.S. Cl.
CPC ................................ *G06F 13/4282* (2013.01)

(58) Field of Classification Search
CPC .................................................. G06F 13/4282
See application file for complete search history.

(56) References Cited

U.S. PATENT DOCUMENTS

| | | | |
|---|---|---|---|
| 2014/0112339 A1* | 4/2014 | Safranek et al. | H04L 9/0662 370/389 |
| 2014/0237013 A1* | 8/2014 | Yan | G06F 7/584 708/252 |
| 2015/0127856 A1* | 5/2015 | Wortman et al. | G06F 13/4282 710/11 |
| 2015/0227473 A1 | 8/2015 | Feng | |
| 2017/0185502 A1* | 6/2017 | Iyer et al. | G06F 11/221 |

FOREIGN PATENT DOCUMENTS

| | | |
|---|---|---|
| CN | 1819046 A | 8/2006 |
| CN | 106021163 A | 10/2016 |
| CN | 107506326 A | 12/2017 |
| CN | 111400232 A | 7/2020 |

OTHER PUBLICATIONS

YIN, Design and Realization of Scrambler_descrambler In USB3.0 Based on Parallel Flash, Computer & Digital Engineering, Feb. 28, 2018, pp. 415-418, Vol. 46, No. 2.

* cited by examiner

*Primary Examiner* — Henry Tsai
*Assistant Examiner* — Harry Z Wang
(74) *Attorney, Agent, or Firm* — Hudak, Shunk & Farine Co. LPA

(57) ABSTRACT

A scramble and descramble hardware implementation method based on data bit width expansion. After expansion, redundant terms are eliminated, and scramble/descramble operation results within the current operation cycle and the value of the shift register after shifting are calculated at once. The present method exhibits advantageous effects with respect to the scramble and descramble polynomial defined by USB3.1 and PCI-Express3.0 protocols, and can obtain a relatively small hardware delay, so that the system can work at a higher frequency.

4 Claims, 2 Drawing Sheets

| Bit width / Solution | 16-bit | 32-bit | 64-bit | 128-bit |
|---|---|---|---|---|
| Single-bit iteration | 16 | 32 | 64 | 128 |
| Expansion based on data bit width | 9 | 12 | 15 | 18 |

Fig.2

SCRAMBLE AND DESCRAMBLE HARDWARE IMPLEMENTATION METHOD BASED ON DATA BIT WIDTH EXPANSION

FIELD OF THE INVENTION

The present invention relates to the field of USB, and particularly, relates to scramble and descramble hardware implementation method based on data bit width expansion.

BACKGROUND OF THE INVENTION

USB is the abbreviation of Universal Serial Bus. It is an external bus standard used to regulate the connection and communication between computers and external devices. A USB interface supports plug-and-play and hot-plugging of a device. The USB standard was jointly proposed by Intel, Compaq, IBM, Microsoft and other companies at the end of 1994, and has been widely used in various electronic devices such as computers, mobile phones, and digital cameras.

The USB standard is formulated and maintained by USB-IF (the USB official organization). Since the beginning, four versions, i.e., USB1.1, USB2.0, USB3.0 and USB3.1 have been released. The new version is forward compatible with the former versions. The maximum transfer rate supported by each version is listed as follows: USB1.1: 12 Mbps; USB2.0: 480 Mbps; USB3.0: 5 Gbps; USB3.1: 10 Gbps. PCI-Express is the abbreviation of Peripheral Component Interconnect Express. It is a high-speed serial computer expansion bus standard and is widely used in computer motherboards and expansion devices such as graphics cards, sound cards, network cards, built-in Modems, IEEE1394 cards, IDE interface cards, RAID cards, TV cards, video capture cards, and a wide variety of other expansion cards. PCI-Express supports 1 lane link up to 32 lane links, with very good scalability to meet the different requirements of different system devices for data transmission bandwidth.

The PCI-Express standard is formulated and maintained by PCI-SIG (PCI Special Interest Group) organization. The existing major versions and the maximum transfer rate supported by a single lane link are: PCI-Express 2.0: 5 Gbps; PCI-Express 3.0: 8 Gbps. According to a specific polynomial, scramble generates a pseudo-random number sequence based on binary original data through linear feedback. After scramble, the distribution of binary data 0 and 1 will be more balanced, which can reduce electromagnetic radiation interference during high-speed transmission. The method which restores pseudo-random numbers to the original data is called descramble, corresponding against scramble. Both USB3.1 and PCI-Express 3.0 protocols use scramble and descramble technologies, wherein original data are subjected to scramble before transmitted by a sender to reduce electromagnetic radiation interference generated during a high-speed data transmission. Upon receipt, the data will be descrambled and restored to the original data, and then processed according to a protocol by the receiver.

The same scramble and descramble polynomials are used in the USB3.1 and PCI-Express 3.0 protocols. The physical layer of the protocol is responsible for scramble processing of the data to be sent, and descramble processing of the data received. The polynomial for linear feedback is: $G(X)=X^{23}+X^{21}+X^{16}+X^8+X^5+X^2+1$.

The USB3.1 and PCI-Express 3.0 protocols define a single-bit scramble and descramble implementation, as shown in FIG. 1. In the implementation of FIG. 1, one fixed-bit width (such as 16-bit, 32-bit or 64-bit, etc.) data (data_in) is input per working cycle, and then scrambled prior to outputting the result data_out. The implementation uses a 23-bit linear feedback shift register (lfsr[22:0]), and the input data is iterated and calculated bit by bit from low to high of the least significant bit (LSB). The specific operation steps of the scramble are:

Step 1: performing XOR using the least significant digit D0 of input data data_in with the top digit D22 of the lfsr to obtain the lowest bit of the output data data_out.

Step 2: performing a single-bit shift on the lfsr according to the circuit structure shown in FIG. 1 (corresponding to the polynomial: $X^{23}+X^{21}+X^{16}+X^8+X^5+X^2+1$) to obtain a new lfsr value, the corresponding algorithm is as follows:

D0(n+1)=D22(n);
D1(n+1)=D0(n);
D2(n+1)=D1(n)^D22(n);
D3(n+1)=D2(n);
D4(n+1)=D3(n);
D5(n+1)=D4(n)^D22(n);
D6(n+1)=D5(n);
D7(n+1)=D6(n);
D8(n+1)=D7(n)^D22(n);
D9(n+1)=D8(n);
D10(n+1)=D9(n);
D11(n+1)=D10(n);
D12(n+1)=D11(n);
D13(n+1)=D12(n);
D14(n+1)=D13(n);
D15(n+1)=D14(n);
D16(n+1)=D15(n)^D22(n);
D17(n+1)=D16(n);
D18(n+1)=D17(n);
D19(n+1)=D18(n);
D20(n+1)=D19(n);
D21(n+1)=D20^D22(n);
D22(n+1)=D21(n);

wherein the symbol "^" represents single-bit data XOR, n represents the value of the linear feedback shift register (lfsr) of the current cycle, and n+1 represents the value of the linear feedback shift register (lfsr) of the next cycle;

Step 3: performing XOR using the second digit D1 of the input data data_in with the top digit D22 of the new lfsr after shifting in step 2 to obtain the second digit of the output data data_out;

Step 4: repeating step 2 and step 3 until all digits of the data of the current cycle are processed, and finally obtaining the scramble result data_out of the input data data_in of the current cycle;

Step 5: repeating step 1 to step 4 in the next cycle, calculating a scramble result data_out of the next cycle based on the value of the last lfsr of the current cycle and the new data_in value input in the next cycle.

Descramble is an operation that restores the pseudo-random number after scramble to the original input data. The circuit structure and operation steps employed are the same as those of scramble. The difference is that the input data data_in of descramble is the pseudo-random numbers after scramble, and the output result data_out is the original input data before scramble. As long as the value of the linear feedback shift register (lfsr) of the sender's scramble is ensured to be synchronized with the value of the linear feedback shift register (lfsr) of the receiver's descramble, the two parties can implement a real time synchronized data transmission. USB3.1/PCI-Express3.0 defines special characters (symbol) and sequences (order set) and thereby ensuring synchronization of the linear feedback shift registers of the sending party and the receiving party.

The disadvantages of the scramble and descramble based on single-bit shift provided by the USB3.1 and PCI-Express3.0 protocols are that each cycle requires more iterations, which takes a long time, and the hardware delay of the results generated by the scramble and descramble is significant, which limits the operating frequency and overall performance of the system.

SUMMARY OF THE INVENTION

An objective of the present invention is to provide a scramble and descramble hardware implementation method based on data bit width expansion under the premise of complying with the USB3.1 and PCI-Express3.0 protocols. By eliminating redundant terms after expansion, the hardware delay of the results generated by the scramble and descramble is shortened, thereby allowing the system to operate at higher frequencies.

In order to carry out the above-mentioned objective, the present invention provides a scramble and descramble hardware implementation method based on data bit width expansion, assuming that the data bit width is N, the method is as follows:

Step 1: performing XOR using a least significant digit of input data with a top digit of a shift register to obtain a least significant digit of an output data;

Step 2: performing iterations and expansions on the shift register according to a polynomial $X^{23}+X^{21}+X^{16}+X^8+X^5+X^2+1$ until obtaining a value of the linear feedback shift register after 1 to N iterations, and then eliminating redundant terms in the expansions according to $a\wedge a\wedge b=b$ (a and b are binary variables), wherein one-step algorithm is as follows:

$D0(n+1)=D22(n);$
$D1(n+1)=D0(n);$
$D2(n+1)=D1(n)\wedge D22(n);$
$D3(n+1)=D2(n);$
$D4(n+1)=D3(n);$
$D5(n+1)=D4(n)\wedge D22(n);$
$D6(n+1)=D5(n);$
$D7(n+1)=D6(n);$
$D8(n+1)=D7(n)\wedge D22(n);$
$D9(n+1)=D8(n);$
$D10(n+1)=D9(n);$
$D11(n+1)=D10(n);$
$D12(n+1)=D11(n);$
$D13(n+1)=D12(n);$
$D14(n+1)=D13(n);$
$D15(n+1)=D14(n);$
$D16(n+1)=D15(n)\wedge D22(n);$
$D17(n+1)=D16(n);$
$D18(n+1)=D17(n);$
$D19(n+1)=D18(n);$
$D20(n+1)=D19(n);$
$D21(n+1)=D20\wedge D22(n);$
$D22(n+1)=D21(n);$ wherein symbol "$\wedge$" represents single-bit data XOR, n represents a value of the shift register of the current cycle, and n+1 represents a value of the shift register after the iterations are completed;

Step 3: performing XOR using a respective 1st bit to (N-1)th bit of the input data with a respective top digit of the shift register that have been iterated respectively for 1 to N-1 times and that the redundant terms have been eliminated respectively, and obtaining 1$^{th}$ bit to (N-1)$^{th}$ bit of the output data.

Further, the shift register is a linear feedback shift register.

Further, the method of the present invention is applicable to all USB protocols in which scramble and descramble polynomials are $G(X)=X^{23}+X^{21}+X^{16}+X^8+X^5+X^2+1$.

Further, the data bit width N can be any positive integer.

In completion of hardware implementation of the USB3.1 and PCI-Express3.0 protocols, the scramble and descramble are implemented by expansion based on data bit width and elimination of redundant terms. The present method exhibits advantageous effects with respect to the scramble and descramble polynomial defined by USB3.1 and PCI-Express3.0 protocols, and can obtain a relatively small hardware delay, so that the system can work at a higher frequency.

BRIEF DESCRIPTION OF THE DRAWINGS

FIG. 2 is a schematic diagram for comparison of hardware delays required by the single-bit -based iterations and the data-bit-width-based expansion method.

DETAILED DESCRIPTION OF THE INVENTION

Figure 1:
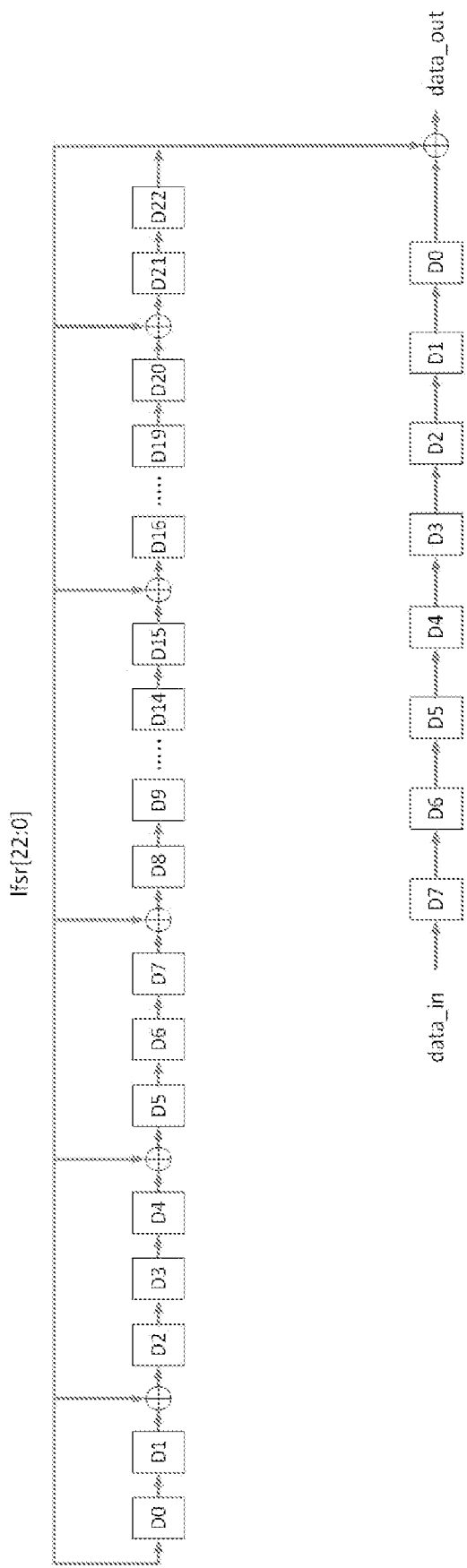
FIG. 1 is a schematic diagram of a prior art USB3.1/PCI-Express3.0 single-bit shift scramble.

In order to make the objectives, technical solutions and advantages of the present invention more clear, the present invention will be further described in detail below with reference to the accompanying drawings and embodiments. It should be understood that the specific embodiments described herein are merely used to explain, but not to limit the present invention. In addition, the technical features involved in various embodiments of the present invention described below can be combined with one another as long as they do not conflict with one another.

The scramble and descramble hardware implementation method based on data bit width expansion provided in the present invention first performs an expansion, then eliminates the redundant terms, and calculates the results of scramble/descramble of the current operation cycle and the value of the shift register after shifting at once. In order to better understand the method of the present invention, the second step of the method of the present invention will be explained by way of example, that is, the shift register will be iterated and expanded according to the polynomial $X^{23}+X^{21}+X^{16}+X^8+X^5+X^2+1$. The example is as follows; wherein D(0) represents the original data, D(n) represents the data after n iterations. The lfsr values after 8 iterations are listed below:

$D0(8)=D15(0)\wedge D22(0)\wedge D17(0)\wedge D19(0)\wedge D21(0);$
$D1(8)=D16(0)\wedge D18(0)\wedge D20(0)\wedge D22(0);$
$D2(8)=D17(0)\wedge D19(0)\wedge D21(0)\wedge D15(0)\wedge D22(0)\wedge D17(0)\wedge D19(0)\wedge D21(0);$
$D3(8)=D18(0)\wedge D20(0)\wedge D22(0)\wedge D16(0)\wedge D18(0)\wedge D20(0)\wedge D22(0);$
$D4(8)=D19(0)\wedge D21(0)\wedge D17(0)\wedge D19(0)\wedge D21(0);$
$D5(8)=D20(0)\wedge D22(0)\wedge D18(0)\wedge D20(0)\wedge D22(0)\wedge D15(0)\wedge D22(0)\wedge D17(0)\wedge D19(0)\wedge D21(0);$
$D6(8)=D21(0)\wedge D19(0)\wedge D21(0)\wedge D16(0)\wedge D18(0)\wedge D20(0)\wedge D22(0);$
$D7(8)=D22(0)\wedge D20(0)\wedge D22(0)\wedge D17(0)\wedge D19(0)\wedge D21(0);$
$D8(8)=D0(0)\wedge D21(0)\wedge D18(0)\wedge D20(0)\wedge D22(0)\wedge D15(0)\wedge D22(0)\wedge D17(0)\wedge D19(0)\wedge D21(0);$
$D9(8)=D1(0)\wedge D22(0)\wedge D19(0)\wedge D21(0)\wedge D16(0)\wedge D18(0)\wedge D20(0)\wedge D22(0);$ $D10(8)=D2(0)\wedge D20(0)\wedge D22(0)\wedge D17(0)\wedge D19(0)\wedge D21(0);$
$D11(8)=D3(0)\wedge D21(0)\wedge D18(0)\wedge D20(0)\wedge D22(0);$
$D12(8)=D4(0)\wedge D22(0)\wedge D19(0)\wedge D21(0);$
$D13(8)=D5(0)\wedge D20(0)\wedge D22(0);$
$D14(8)=D6(0)\wedge D21(0);$
$D15(8)=D7(0)\wedge D22(0);$
$D16(8)=D8(0)\wedge D15(0)\wedge D22(0)\wedge D17(0)\wedge D19(0)\wedge D21(0);$
$D17(8)=D9(0)\wedge D16(0)\wedge D18(0)\wedge D20(0)\wedge D22(0);$
$D18(8)=D10(0)\wedge D17(0)\wedge D19(0)\wedge D21(0);$
$D19(8)=D11(0)\wedge D18(0)\wedge D20(0)\wedge D22(0);$
$D20(8)=D12(0)\wedge D19(0)\wedge D21(0);$
$D21(8)=D13(0)\wedge D20(0)\wedge D22(0)\wedge D15(0)\wedge D22(0)\wedge D17(0)\wedge D19(0)\wedge D21(0);$
$D22(8)=D14(0)\wedge D21(0)\wedge D16(0)\wedge D18(0)\wedge D20(0)\wedge D22(0);$ taking D5(8) as an example, in the expression after expansion, D20(0) appears two times and D22(0) appears three times. After the redundant terms are eliminated according to $a\wedge a\wedge b=b$ (a and b are binary variables), D5(8) can be simplified as: $D5(8) = D21(0) \wedge D15(0) \wedge D17(0) \wedge D18(0) \wedge D19(0) \wedge D22(0);$ and the lfsr values after 8 iterations and elimination of redundant terms are listed below:

$D0(8)=D21(0)\wedge D15(0)\wedge D17(0)\wedge D19(0)\wedge D22(0);$
$D1(8)=D20(0)\wedge D18(0)\wedge D16(0)\wedge D22(0);$
$D2(8)=D15(0)\wedge D22(0);$
$D3(8)=D16(0);$
$D4(8)=D17(0);$
$D5(8)=D21(0)\wedge D15(0)\wedge D17(0)\wedge D18(0)\wedge D19(0)\wedge D22(0);$
$D6(8)=D20(0)\wedge D18(0)\wedge D19(0)\wedge D16(0)\wedge D22(0);$
$D7(8)=D21(0)\wedge D20(0)\wedge D17(0)\wedge D19(0);$
$D8(8)=D15(0)\wedge D20(0)\wedge D17(0)\wedge D18(0)\wedge D19(0)\wedge D0(0);$
$D9(8)=D20(0)\wedge D21(0)\wedge D1(0)\wedge D18(0)\wedge D19(0)\wedge D16(0);$
$D10(8)=D21(0)\wedge D20(0)\wedge D17(0)\wedge D19(0)\wedge D20(0)\wedge D2(0);$
$D11(8)=D20(0)\wedge D21(0)\wedge D3(0)\wedge D18(0)\wedge D22(0);$
$D12(8)=D21(0)\wedge D19(0)\wedge D4(0)\wedge D22(0);$
$D13(8)=D20(0)\wedge D22(0)\wedge D5(0);$
$D14(8)=D21(0)\wedge D6(0);$
$D15(8)=D7(0)\wedge D22(0);$
$D16(8)=D21(0)\wedge D15(0)\wedge D17(0)\wedge D19(0)\wedge D8(0)\wedge D22(0);$
$D17(8)=D20(0)\wedge D18(0)\wedge D16(0)\wedge D22(0)\wedge D9(0);$
$D18(8)=D21(0)\wedge D17(0)\wedge D19(0)\wedge D10(0);$
$D19(8)=D20(0)\wedge D18(0)\wedge D22(0)\wedge D11(0);$
$D20(8)=D21(0)\wedge D19(0)\wedge D12(0);$
$D21(8)=D21(0)\wedge D15(0)\wedge D20(0)\wedge D17(0)\wedge D13(0)\wedge D19(0);$
$D22(8)=D20(0)\wedge D21(0)\wedge D18(0)\wedge D16(0)\wedge D22(0)\wedge D14(0).$ The following will take a 32-bit width as an example to compare the delay of the default single-bit iterations and the delay of the scramble and descramble hardware implementation based on bit width expansion. With respect to the scramble and descramble implementations based on single-bit iterations defined in the USB3.1 and PCI-Express3.0 protocols, the iterations are performed with 1 bit, and the maximum delay in a single cycle is that for generating the top bit (bit 32) of the data, which requires 31 iterations, and the delay of each iteration is the hardware delay required for one "single-bit data XOR" (referred to as "T" here). The total delay required for the iterations is 31*T. After iterations, a delay of one "single-bit data XOR " is needed for generating the output result. Therefore, it takes 32*T in total to generate the result of the top bit, and for this solution, this is also the total delay of a single cycle for generating the data.

With respect to the scramble and descramble implementation based on data bit width expansion provided in the present invention: according to the single-step iteration method of step 2, iterations are performed one to 32 times to obtain respective expansions, and then eliminate the redundant terms.

1) The expansion after 32 iterations is used to calculate the lfsr of the next cycle, and the result after elimination of redundant iterms is as follows:

$D0(32)=D3(0)\wedge D22(0)\wedge D11(0)\wedge D21(0)\wedge D20(0)\wedge D13(0)\wedge D18(0)\wedge D16(0)\wedge D1(0)\wedge D2(0)\wedge D14(0);$
$D1(32)=D3(0)\wedge D22(0)\wedge D21(0)\wedge D0(0)\wedge D4(0)\wedge D12(0)\wedge D15(0)\wedge D17(0)\wedge D19(0)\wedge D2(0)\wedge D14(0);$
$D2(32)=D11(0)\wedge D5(0)\wedge D21(0)\wedge D0(0)\wedge D4(0)\wedge D15(0)\wedge D2(0)\wedge D14(0);$
$D3(32)=D3(0)\wedge D22(0)\wedge D6(0)\wedge D5(0)\wedge D16(0)\wedge D12(0)\wedge D1(0)\wedge D15(0);$
$D4(32)=D6(0)\wedge D13(0)\wedge D0(0)\wedge D7(0)\wedge D4(0)\wedge D16(0)\wedge D17(0)\wedge D2(0);$
$D5(32)=D22(0)\wedge D11(0)\wedge D5(0)\wedge D20(0)\wedge D21(0)\wedge D13(0)\wedge D8(0)\wedge D7(0)\wedge D16(0)\wedge D17(0)\wedge D2(0);$
$D6(32)=D3(0)\wedge D22(0)\wedge D6(0)\wedge D21(0)\wedge D18(0)\wedge D0(0)\wedge D8(0)\wedge D9(0)\wedge D12(0)\wedge D17(0)\wedge D14(0);$
$D7(32)=D22(0)\wedge D13(0)\wedge D18(0)\wedge D0(0)\wedge D7(0)\wedge D4(0)\wedge D9(0)\wedge D1(0)\wedge D15(0)\wedge D19(0)\wedge D10(0);$
$D8(32)=D3(0)\wedge D22(0)\wedge D5(0)\wedge D21(0)\wedge D13(0)\wedge D18(0)\wedge D0(0)\wedge D8(0)\wedge D19(0)\wedge D10(0);$
$D9(32)=D22(0)\wedge D6(0)\wedge D11(0)\wedge D20(0)\wedge D0(0)\wedge D4(0)\wedge D9(0)\wedge D1(0)\wedge D19(0)\wedge D14(0);$
$D10(32)=D5(0)\wedge D20(0)\wedge D21(0)\wedge D7(0)\wedge D12(0)\wedge D15(0)\wedge D1(0)\wedge D2(0)\wedge D10(0);$
$D11(32)=D3(0)\wedge D22(0)\wedge D6(0)\wedge D11(0)\wedge D21(0)\wedge D13(0)\wedge D8(0)\wedge D16(0)\wedge D2(0);$
$D12(32)=D3(0)\wedge D22(0)\wedge D0(0)\wedge D7(0)\wedge D4(0)\wedge D9(0)\wedge D12(0)\wedge D17(0)\wedge D14(0);$
$D13(32)=D5(0)\wedge D13(0)\wedge D18(0)\wedge D0(0)\wedge D8(0)\wedge D4(0)\wedge D1(0)\wedge D15(0)\wedge D10(0);$
$D14(32)=D6(0)\wedge D11(0)\wedge D5(0)\wedge D0(0)\wedge D16(0)\wedge D9(0)\wedge D1(0)\wedge D19(0)\wedge D2(0)\wedge D14(0);$
$D15(32)=D3(0)\wedge D6(0)\wedge D20(0)\wedge D0(0)\wedge D7(0)\wedge D12(0)\wedge D1(0)\wedge D15(0)\wedge D17(0)\wedge D2(0)\wedge D10(0);$
$D16(32)=D22(0)\wedge D20(0)\wedge D8(0)\wedge D7(0)\wedge D4(0)\wedge D14(0);$
$D17(32)=D5(0)\wedge D21(0)\wedge D8(0)\wedge D9(0)\wedge D15(0);$
$D18(32)=D22(0)\wedge D6(0)\wedge D0(0)\wedge D16(0)\wedge D9(0)\wedge D10(0);$
$D19(32)=D11(0)\wedge D0(0)\wedge D7(0)\wedge D1(0)\wedge D17(0)\wedge D10(0);$
$D20(32)=D11(0)\wedge D18(0)\wedge D8(0)\wedge D12(0)\wedge D1(0)\wedge D2(0);$
$D21(32)=D22(0)\wedge D11(0)\wedge D20(0)\wedge D21(0)\wedge D18(0)\wedge D0(0)\wedge D16(0)\wedge D9(0)\wedge D12(0)\wedge D1(0)\wedge D19(0)\wedge D14(0);$
$D22(32)=D22(0)\wedge D21(0)\wedge D20(0)\wedge D13(0)\wedge D0(0)\wedge D12(0)\wedge D1(0)\wedge D15(0)\wedge D17(0)\wedge D19(0)\wedge D2(0)\wedge D10(0).$ The maximum delay among them is the hardware delay required for 11 times of "single-bit data XOR" (referred to as "T" here) of D21(32) and D22(32), that is, 11*T.

2) In the data result generation part of scramble/descramble, the maximum delay is for the output result after XOR with the top bit D31 of the data_in (input data) after 31 iterations. The maximum delay of the expansions after 31 iterations and elimination of redundant terms is also 11*T. By adding the delay T of XOR with D31, the maximum delay for generating data_out is 11*T+1*T=12*T. Therefore, in the case of 32-bit, the total delay of scramble/descramble expansion based on bit width is the larger one of that for 1) and 2), that is, 12*T.

In FIG. 2, the unit of all delays is the hardware delay required for "single-bit data XOR ". For commonly used different data bit widths, a comparison is made between the hardware delays required for single-bit iteration-based scramble and descramble implementation defined in USB3.1 and PCI-Express3.0 protocols and the hardware delays required for the data bit-width expansion-based scramble and descramble implementation provided in the present invention, wherein the hardware delays required are for completing one-cycle data operation. It can be seen from FIG. 2 that the hardware delay required for the expansion method based on data bit width of the present invention is much less than the hardware delay required for the single-bit iteration method of the prior art. The present invention uses hardware description language and is implemented with the technical solutions described herein and in accordance with USB3.1 and PCI-Express3.0 protocols, and the completion of the implementation can be verified by simulation, comprehensive verification or FPGA.

One skilled in the art will readily understand that the above descriptions are only preferred embodiments of the invention, but not intended for limiting. Any modifications, equivalent substitutions and improvements made within the spirit and principles of the invention should fall within the scope thereof.

What is claimed is:

1. A scramble and descramble hardware implementation method based on data bit width expansion, assuming that the data bit width is N, the method comprising the steps of:

performing XOR using a least significant digit of input data with a top bit of a shift register to obtain a least significant digit of an output data;

performing iterations and expansions on the shift register according to a polynomial $X23+X21+X16+X8+X5+X2+1$ until obtaining a value of the linear feedback shift register after 1 to N iterations, and then eliminating redundant terms in the expansions according to a^a^b=b (a and b are binary variables), wherein single-step algorithm is:

D0(n+1)=D22(n);
D1(n+1)=D0(n);
D2(n+1)=D1(n)^D22(n);
D3(n+1)=D2(n);
D4(n+1)=D3(n);
D5(n+1)=D4(n)^D22(n);
D6(n+1)=D5(n);
D7(n+1)=D6(n);
D8(n+1)=D7(n)^D22(n);
D9(n+1)=D8(n);
D10(n+1)=D9(n);
D11(n+1)=D10(n);
D12(n+1)=D11(n);
D13(n+1)=D12(n);
D14(n+1)=D13(n);
D15(n+1)=D14(n);
D16(n+1)=D15(n)^D22(n);
D17(n+1)=D16(n);
D18(n+1)=D17(n);
D19(n+1)=D18(n);
D20(n+1)=D19(n);
D21(n+1)=D20^D22(n);
D22(n+1)=D21(n);

wherein symbol "^" represents single-bit data XOR, n represents a value of the shift register of the current cycle, and n+1 represents a value of the shift register after the iterations are completed; and performing XOR using a respective $1^{st}$ bit to $(N-1)^{th}$ bit of the input data with a respective top digit of the shift register that have been iterated respectively for 1 to N-1 times and that the redundant terms have been eliminated respectively, and obtaining $1^{th}$ bit to $(N-1)^{th}$ bit of the output data.

2. The scramble and descramble hardware implementation method based on data bit width expansion according to claim 1, wherein the shift register is a linear feedback shift register.

3. The scramble and descramble hardware implementation method based on data bit width expansion according to claim 1, wherein the data bit width N can be any positive integer.

4. The scramble and descramble hardware implementation method based on data bit width expansion according to claim 1, wherein the method is applicable to all USB protocols in which scramble and descramble polynomial is $G(X)=X23+X21+X16+X8+X5+X2+1$.

* * * * *